United States Patent [19]

Kageyama et al.

[11] Patent Number: 4,990,182
[45] Date of Patent: Feb. 5, 1991

[54] CARBON-CONTAINING MAGNETIC METAL POWDER

[75] Inventors: Yoshiteru Kageyama; Yoshiaki Sawada; Tadashi Teramoto, all of Yokkaichi, Japan

[73] Assignee: Mitsubishi Petrochemical Company Limited, Tokyo, Japan

[21] Appl. No.: 401,964

[22] Filed: Sep. 1, 1989

[30] Foreign Application Priority Data

Sep. 5, 1988 [JP] Japan ................................ 63-221952
Oct. 6, 1988 [JP] Japan ................................ 63-252639

[51] Int. Cl.$^5$ ............................................. B22F 9/30
[52] U.S. Cl. ...................................... 148/306; 75/362
[58] Field of Search .................. 75/242, 236, 241, 251, 75/0.5 A, 0.5 AA, 362, 361, 351, 365

[56] References Cited

U.S. PATENT DOCUMENTS

| | | | |
|---|---|---|---|
| 3,966,510 | 6/1976 | Aonuma et al. | 148/105 |
| 4,063,000 | 12/1977 | Aonuma et al. | 428/403 |
| 4,069,073 | 1/1978 | Tadokoro et al. | 148/105 |
| 4,069,367 | 1/1978 | Umeki et al. | 428/403 |
| 4,808,216 | 2/1989 | Kageyama et al. | 75/0.5 A |

Primary Examiner—Stephen J. Lechert, Jr.
Assistant Examiner—Nina Bhat
Attorney, Agent, or Firm—Koda and Androlia

[57] ABSTRACT

A magnetic metal powder comprising fine particles of a transition metal which contain 0.2 to 2.5% by weight of carbon substantially in the form of metal carbide and which are of such a geometry as a minor axis length of 100 to 300 Å and a (major to minor) axial ratio of 1 to 50.

7 Claims, 1 Drawing Sheet

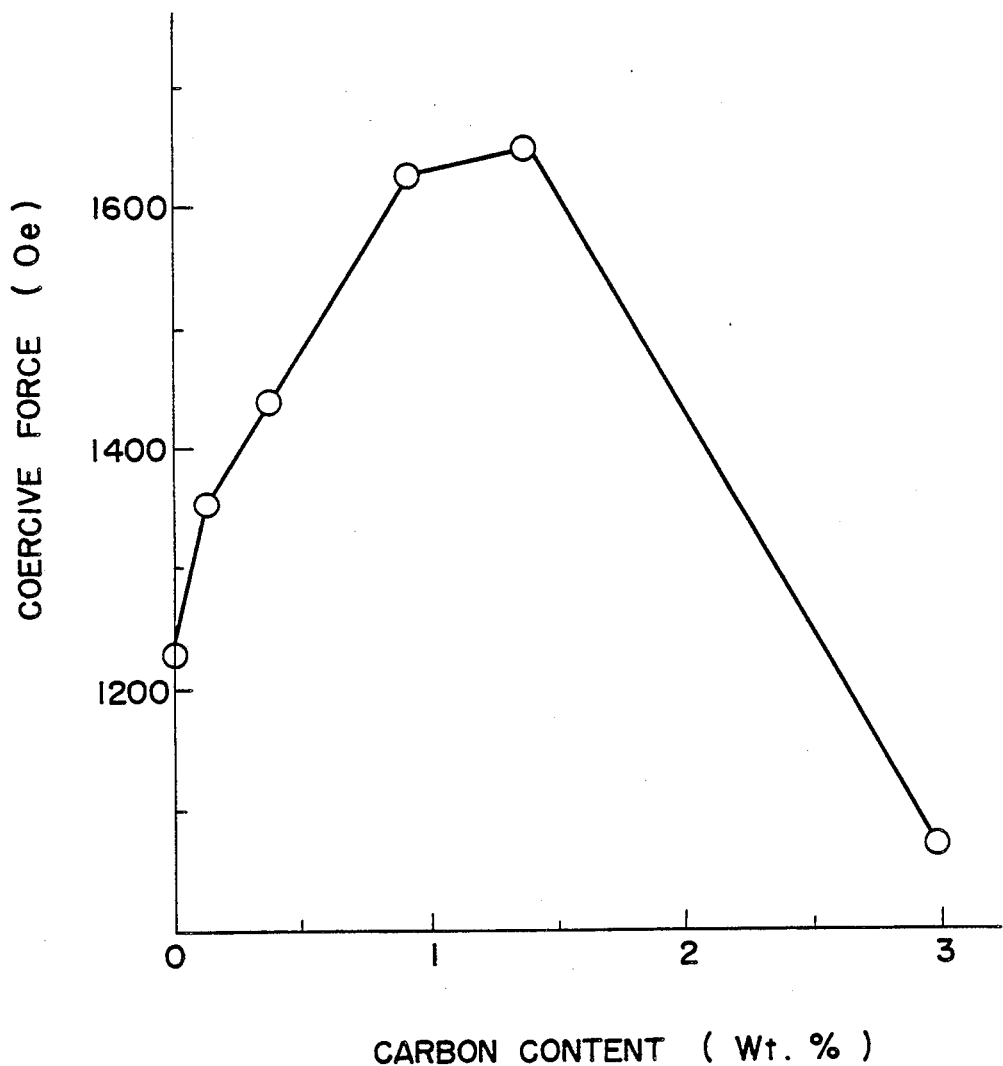

CARBON-CONTAINING MAGNETIC METAL POWDER

BACKGROUND OF THE INVENTION

1. Field of the Invention

This invention relates to a magnetic metal powder suitable for high-density magnetic recording and, more particularly, to a magnetic metal powder with high coercive force, in which the metal contains a certain amount of carbon in the form of metal carbide.

2. Background Art

With recent demands for high-density magnetic recording, practical use has been made of magnetic powders having high coercive force and residual magnetization and formed of iron or an alloy composed mainly of iron in place of iron oxides heretofore used for recording medium purposes such as $\gamma$-$Fe_2O_3$ with or without Co-coating thereon.

Most of currently available magnetic metal powders are obtained by the oxidization of the starting needle-like goethite or hematite, followed by reduction in a hydrogen stream. Such metal powders have improved coercive force due to the specific shape anisotropy of their particles, i.e. the needle-like shape of starting iron oxyhydroxides which is retained even after reduction. With these metal powders, however, it is quite difficult to control the particle size at a level of 300 angatrom (Å) or lower, which is a level requisite for the electromagnetic conversion characteristics of a recording medium, since the mechanism of particle-forming during reduction is so complicated and sintering tends to take place among particles in the course of reduction.

Moreover, the resulting fine metal particles tend to have a rough surface structure and are liable to be very active due to an extended period of reduction, the dehydration reaction of the starting iron oxyhydroxide, etc., whereby they are subject to oxidation in the air. This offers a drawback of poor weathering resistance even after they have been dispersed in a binder to form a coating film.

Thus, there has been a demand for magnetic metal powders substantially free from the above mentioned problems.

As one of the methods for producing such magnetic metal powders, it has been known to subject transition metal carbonyl compounds to gas-phase thermal decomposition as disclosed in, for instance, Japanese Patent Publication Nos. 24316/1968, 11529/1969 and 31809/1977 as well as U.S. Pat. Nos. 2,983,997 and 2,884,319. According to such proposals, the metal carbonyl compounds are decomposed to directly form metal particles which have smoother and more stable surfaces as compared with those obtained by the aforesaid hydrogen reduction methods. These metal particles may thus be suited for coatings. However, the metal particles obtained by this known technique fail to possess such a high coercive force as required for high-density recording, partly because they have too large a particle diameter and contain too large an amount of carbon and partly because the carbon contained therein is not converted into a metal carbide.

SUMMARY OF THE INVENTION

In view of the state of the art as described above, the present inventors have made intensive studies of an improved magnetic metal powder for high-density recording, and finally accomplished the present invention.

Thus, the magnetic metal powder according to the present invention comprises fine particles of a transition metal which contain 0.2 to 2.5% by weight of carbon substantially in the form metal carbide and which are of such a geometry as a minor axis length of 100 to 300 Å and a (major or minor) axial ratio of 1 to 50.

The magnetic metal powder according to the present invention is in the form of uniform and fine particles and contains a specific amount of carbon which is allowed to be present uniformly throughout a metal matrix substantially in the form of metal carbide, whereby such high coercive force as needed for high-density recording is achieved. Moreover, the metal powder of the present invention has an increased hardness as compared with metal powder containing no carbon, and therefore has the advantage of improved wear resistance and weathering resistance when used in coating films.

BRIEF DESCRIPTION OF THE DRAWING

The FIGURE is a graph showing the correlation between the amount of carbon contained in the form of iron carbide in an iron powder and the coercive force of the powder.

DETAILED DESCRIPTION OF THE INVENTION

Magnetic Metal Powder

The magnetic metal powder according to the present invention is constituted by fine particles of a transition metal which contain carbon substantially in the form of metal carbide in an amount of 0.2 to 2.5% by weight, preferably 0.4 to 2% by weight, and which are of such a geometry as a minor axis length of 100 to 300 Å and an axial ratio (major axis length to minor axis length) of 1 to 50.

It is here understood that the terms "minor axis length" and "major axis lengths" each stand for a mean length observed on a given powder.

The carbon content or axial ratio departing from the above scope is unpreferred because of low coercive force and poor weathering resistance of the metal powder.

The metal powder of the present invention may be fine particles of any transition metal such as Fe, Co, Ni and Cr. In particular, particles of Fe or Co alone or mixed or alloy particles composed mainly (at least 60 mol %) of Fe or Co with other transition metals, e.g. Ni and Cr, are preferred.

The minor axis length of the metal powder is preferably in a range of 150 to 250 Å. An axial ratio of 5 to 50, indicating an acicular form of particle, is preferred in the light of coercive force since a coercive force of at least 1200 oersteds is then obtained. Particular preference is given to an axial ratio of 10 to 25 since a coercive force of at least 1300 Oe is then obtained. Magnetic powder of cobalt or composed mainly of cobalt, having an axial ratio of 1 to 3, possesses a coercive force of 800 Oe or higher in spite of small axial ratio. Due to its small axial ratio, moreover, such magnetic powder is more advantageously used for the industrial production of circular or round recording media such as floppy disks as compared with acicular powders, because it needs no orientation due to a magnetic field when used as a coating medium for magnetic recording. Another advantage with such metal powder is an enhanced residual magnetic flux density achievable by increasing the packing density of the metal powder in a coating resin. Heretofore, no magnetic powder of cobalt or composed mainly of cobalt, having an axial ratio of as small as 1 to 3 and yet having such a high coercive force, has been obtained.

The carbon which is contained in the metal powder of the present invention is allowed to be uniformly dispersed and present throughout the metal substantially in the form of metal carbide such as $Fe_3C$, $Fe_5C_2$, $Co_2C$ or $Co_3C$. This carbon should be distinguished from any carbon which might be present in a minute amount independently of the metal, e.g. in the metal lattice or as carbon deposits. This metal carbide is presumed to be formed by the reaction of a part of the carbonyl group with the metal in the course of thermal decomposition. For that purpose, a reaction temperature of at least 400° C. is required.

The formation and presence of such metal carbide may be confirmed by X-ray diffraction or Mossbauer spectrum.

Preparation of metal powder

The magnetic metal powder according to the present invention may be prepared by a process comprising gas-phase decomposition of the corresponding metal carbonyl compound (which may be a mixture).

One preferred process comprises carrying out the gas-phase thermal decomposition of the transition metal carbonyl compound in two steps. According to this preferred process, there may be formed a magnetic metal powder controlled in terms of its carbon content and geometry.

More specifically, the first step is to form a cluster of a transition metal from the corresponding transition metal carbonyl compound in a first reaction zone. For $Fe(CO)_5$ by way of example, the following reaction scheme holds.

$$mFe(CO)_5 \rightarrow Fe_m(CO)_n + (5m-n)CO$$

For $CoH(CO)_4$, the following reaction scheme holds.

$$mCoH(CO)_4 \rightarrow Co_m(CO)_n + (4m-n)CO + m/2H_2$$

How much the metal cluster is formed may be expressed in terms of the (molar) ratio of n/m. When the n/m ratio is adjusted to between 0.1 and 3, then a magnetic metal powder having a carbon content controlled in the range of 0.2 to 2.5% by weight may be obtained through the subsequent reaction in the second step. An unpreferably increased carbon content is obtained without any suitable regulation of the n/m ratio.

Referring to the reaction conditions in the first step, a transition metal carbonyl compound is diluted to 5 to 50% by volume, preferably 10 to 45% by volume with an inert gas such as $N_2$ or He to form a mixed gas, and reaction is then carried out at a reaction temperature of 50° to 200° C., preferably 60° to 180 ° C., for a residence time of 3 to 300 seconds, preferably 10 to 250 seconds.

The second step is to form a magnetic metal powder by the gas-phase thermal decomposition of the above metal cluster in a second reaction zone. More specifically, the metal cluster formed under the above conditions is further diluted with an inert gas, and the mixed gas is then allowed to reside at 400 ° C. or higher for a time of up to 5 seconds, preferably at 450 ° C. for a time of up to 2 seconds, in a reaction system to which a magnetic field of at least 300 gausses (G) is being applied, thereby carrying out gas-phase thermal decomposition reaction to produce a final metal powder.

It is here noted that the degree of dilution of the metal cluster to be further diluted with an inert gas should be 3% by volume or lower preferably 1.5% by volume or lower, based on the transition metal carbonyl compound fed, when it is intended to obtain a metal powder having an axial ratio of 5 to 50, whereas it is 5% by volume or lower, preferably 3% by volume or lower, when it is intended to obtain a metal powder having an axial ratio of 1 to 4.

It is also noted that it is not necessary to apply any magnetic field to the reaction system when it is intended to obtain a metal powder having an axial ratio of 1 to 4.

Use of metal powder

Although the magnetic metal powder of the present invention is preferablly used for a high-density recording medium, there are many other fields for which magnetic metal powders are required and the metal powder of the present invention may be applied thereto as well. The upper limit of the coercive force of the metal powder of the present invention is about 2500 Oe, but may be further increased by some improved techniques. The metal powder of cobalt having an axial ratio of 1 to 3 is especially preferred for use in circular or round recording media such as floppy disks.

Magnetic recording media, that are one of major fields to which the metal powder of the present invention may possibly be applied, may be produced by conventional methods.

For example, a recording medium may be produced by mixing a metal powder with a binder, optionally with the addition of other additives and coating the resulting mixture onto a support substrate such as a polyester film to form a magnetic film, followed by drying and surface treatments. The binder used to this end may be a known thermoplastic resin, a thermosetting resin or a mixture thereof. As the additives, use may be made of dispersants, lubricants, abrasives, antistatic agents and so on.

Example 1

In a reactor comprising two cylindrical reaction tubes connected in series with each other, a mixed gas of $Fe(CO)_5$ diluted with nitrogen was successively subjected to gas-phase thermal decomposition reactions under the following conditions, thereby obtaining a carbon-containing magnetic iron powder.

Reaction Conditions

First Reaction Zone $Fe(CO)_5$: 10% by volume
Reaction Temp.: 160° C.
Residence Time: 100 seconds

Second Reaction Zone $Fe_m(CO)_n$: 0.8% by volume (calculated in terms of the $Fe(CO)_5$ fed
Reaction Temp.: 550° C.
Residence Time: 0.7 second
D.C. Magnetic Field: 600 G By elemental analysis, the product from the first reaction zone was found to be iron cluster particles of $Fe_m(CO)_n$ (n/m=1).

The finally produced magnetic powder contained 0.7% by weight of carbon which was identified as $Fe_3C$ by Mössbauer spectrum. By measurement with an oscillatory type magnetometer (manufactured by Riken Electronics Co., Ltd.), the product was found to have such magnetic characteristics as expressed in terms of a coercive force of 1560 Oe and a saturation magnetization of 145 emu/g. The product was also found to have an axial ratio of 10 and a minor axis length of 220 Å.

Example 2

Gas-phase thermal decomposition reaction was carried out in the same manner as in Example 1 except that the reaction temperature Was changed to 130° C. in the first reaction zone.

As a result, the cluster from the first reaction zone was found to be iron cluster particles with $n/m=0.7$.

Given below are the carbon content, shape and magnetic characteristics of the produced magnetic powder.
Carbon Content: 1.5% by weight
Coersive Force: 1630 Oe
Saturation Magnetization: 150 emu/g
Minor Axis Length: 180 Å
Axial Ratio: 10

Comparative Example 1

Under the reaction conditions of Example 1, $Fe(CO)_5$ diluted with nitrogen to a concentration of 0.8% by volume was fed directly into the second reaction zone for the gas-phase thermal decomposition reaction, not through the intermediary of the first reaction zone. The produced magnetic powder contained 3.0% by weight of carbon and was found to have a coercive force of 1080 Oe and a saturation magnetization of 145 emu/g.

The metal powder particles had a axial ratio of 10 and a minor axis length of 240 Å.

Example 3

In the reactor used in Example 1, a mixed gas of $CoH(CO)_4$ diluted with nitrogen was successively subjected to gas-phase thermal decomposition reactions under the following conditions, thereby obtaining a carbon-containing magnetic cobalt powder.

Reaction Conditions

First Reaction Zone $CoH(CO)_4$: 10% by volume
Reaction Temp.: 60° C.
Residence Time: 100 seconds Second Reaction Zone $Co_m(CO)_n$: 0.8% by volume (calculated in terms of the $CoH(CO)_4$ fed), $m/n=0.9$
Reaction Temp.: 450° C.
Residence Time: 0.7 second By elemental analysis, the product from the first reaction zone was found to be cobalt carbonyl cluster particles of $Co_m(CO)_n (n/m=0.9)$.

The magnetic powder obtained comprised spherical particles having a mean diameter of 250 Å. This powder contained 1.3% by weight of carbon that was identified as $Co_2C$ by X-ray diffraction.

By measurement with an oscillatory type magnetometer (manufactured by Riken Electronics Co., Ltd.), the product was found to have a coercive force of 1330 Oe and a saturation magnetization of 130 emu/g.

Comparative Example 2

Under the reaction conditions of Example 3, $CoH(CO)_4$ diluted with nitrogen to a concentration of 0.8% by volume was fed directly into the second reaction zone for its thermal decomposition reaction, not through the intermediary of the first reaction zone. The obtained magnetic powder contained 3.3% by weight of carbon that was identified as $Co_2C$ by X-ray diffraction. The powder was found to have a coercive force of 760 Oe and a saturation magnetization of 120 emu/g. The particles were in spherical forms having an average diameter of 280 Å.

Comparative Example 3

Gas-phase thermal decomposition reaction was carried out in the same manner as in Example 3 except that the reaction temperature in the second reaction zone was changed to 280° C.

The obtained magnetic powder contained 1.0% by weight of carbon, but any peak showing cobalt carbides such as $Co_2C$ was not found in the X-ray diffraction pattern.

The powder was found to have a coercive force of 600 Oe and a saturation magnetization of 135 emu/g. The particles were in spherical forms having an average diameter of 330 Å.

Application Example

<Production of Magnetic Recording Media>

100 parts by weight of the magnetic powder of Fe obtained in Example 1 was premilled using a pin type mill (manufactured by Netzsch Co., Ltd.) with a liquid A having the composition (in parts by weight):
Bayer 8300, Toyobo: 11.4
Bayer 8200, Toyobo: 7.6
Carbon Black (Lavender 450): 2.0
Alumina Powder (Nortonhomo E-440): 5.0
Solvents (Toluene/MEK/Anon 1:1:1): 150

In this premilling a suitable viscosity is in a range of 10,000 to 30,000 cP and an operating temperature is 45° C. or lower.

While care is taken of excessive dispertion, the completion of premilling is determined by the combined use of the glossiness of coating film, SEM photography and centrifugal viscometry.

Next, to the liquid A after the completion of premilling is gradually added a liquid B having the composition (in parts by weight):
Modified vinyl chloride acetate resin (MR-110, manufactured by Nippon Zeon): 2.0

| Lubricants | Oil (manufactured by KAO) | 1.0 |
| | Myristic acid | 2.0 |
| | Butyl stearate | 1.0 |

Solvents (the same as described above): 100
Cross-linking agent (Desmodule N-3200, added just prior to coating): 5,
while stirring with Disolver. After the completion of the addition, final milling is carried out with Dinomill (with a bead diameter of 0.5 to 0.7 mm$\phi$).

In this milling a suitable viscosity is in a range of 7,000 to 1,000 cP and an operating temperature is 35° C. or lower.

This liquid is passed through plastic filters of 1, 2 and 3 μ in series such as Kuno Filter and then coated on a PET film (12 μ) with the use of a gravure coater.

Immediately after coating and drying, the coated film is calendered with plastic rolls made of nylon at 350 kg/cm$_2$ and 80° C., and is then placed in an oven in which it is allowed to stand for 24 to 35 hours to effect cross-linking.

The film sheet after cross-linking is cut for an 8-mm video tape with a slitter, and is then incorporated into a cassette.

The magnetic characteristics of the thus obtained 8-mm video tape are shown in Table 1, and its electromagnetic conversion characteristics are shown in Table 2.

TABLE 1

(Measured at Hm ≈ 5 KOe)

| | Tape Thickness (Thickness of coating in μ) | Hc (Oe) | Br (Gauss) | Bm | Sq | S.F.D. |
|---|---|---|---|---|---|---|
| Sample 1 | 3.5 | 1510 | 2810 | 3200 | 0.88 | 0.55 |
| Sample 2 | 3.3 | 1480 | 2750 | 3400 | 0.80 | 0.58 |
| Commercial Product A | 3.1 | 1515 | 2785 | 3225 | 0.86 | 0.47 |

TABLE 2

(Measured with 8-mm Video Recorder of Sony)

| | Video (S/N) | Chroma (S/N) AM | PM |
|---|---|---|---|
| Sample 1 | 45.7 | 42.8 | 38.9 |
| Sample 2 | 46.0 | 44.0 | 40.5 |
| Commercial Product A | 45.4 | 43.5 | 39.7 |

In Tables 1 and 2, symbols refer to:
Hc: Coercive Force
Br: Residual Magnetization Density
Bm: Saturation Magnetization Density
Sq: Br/Bm
S.F.D: Half-Value Width (Oe)/Magnetic Field (gauss)
when a differential curve is at a peak value.
S/N: Signal to Noise Ratio
AM: Analog Signal
PM: Digital Signal

What is claimed is:

1. A magnetic metal powder comprising fine particles of a transition metal which contain 0.2% to 2.5% by weight of carbon substantially in the form of metal carbide and which are of such a geometry as a minor axis length of 100 to 300 Å and an axial ratio of 1 to 50.

2. The magnetic metal powder according to claim 1, wherein the carbon content is 0.4 to 2% by weight.

3. The magnetic metal powder according to claim 1, wherein the minor axis length is 150 to 250 Å.

4. The magnetic metal powder according to claim 1, wherein the fine particles are those of Fe, Co or are mixed or alloy particles composed mainly of Fe or Co.

5. The magnetic metal powder according to claim 1, which has an axial ratio of 5 to 50 and a coercive force of at least 1200 Oe.

6. The magnetic metal powder according to claim 5, which has an axial ratio of 10 to 25 and a coercive force of at least 1300 Oe.

7. The magnetic powder according to claim 1 comprising fine particles of cobalt or composed mainly of cobalt, which has an axial ratio of 1 to 3 and a coercive force of at least 800 Oe.

* * * * *